United States Patent [19]

Brasher

[11] Patent Number: 4,576,107
[45] Date of Patent: Mar. 18, 1986

[54] APPARATUS FOR DETECTING THE LEVEL OF PARTICULATE SOLIDS IN A SHUTTLE CAR

[75] Inventor: John K. Brasher, Helper, Utah
[73] Assignee: Atlantic Richfield Company, Los Angeles, Calif.
[21] Appl. No.: 611,279
[22] Filed: May 17, 1984
[51] Int. Cl.⁴ .............................................. G01F 23/00
[52] U.S. Cl. ..................... 116/227; 414/528
[58] Field of Search ............... 116/227, 264, 228, 266, 116/229, 271, 275, 273, 284, 274, 215; 73/307, 317; 414/528, 289; 198/301, 469, 502

[56] References Cited

U.S. PATENT DOCUMENTS

| | | | |
|---|---|---|---|
| 1,682,843 | 9/1928 | Jacobus | 73/307 |
| 2,570,952 | 10/1951 | Hyland | 116/215 |
| 2,718,867 | 9/1955 | Ray | 116/215 |
| 2,915,205 | 12/1959 | Strader | 414/289 |
| 3,085,432 | 4/1963 | Bloom et al. | 116/275 |
| 3,183,017 | 5/1965 | Lundquist | 414/528 |
| 4,291,777 | 9/1981 | Yale | 414/528 |

Primary Examiner—Charles Frankfort
Assistant Examiner—Patrick R. Scanlon
Attorney, Agent, or Firm—F. Lindsey Scott

[57] ABSTRACT

An apparatus for detecting an increase to a selected level of the height of a bed of particulate solids in a shuttle car for the transportation of particulate solids. The apparatus including a support member adapted to be rotatably supported through or on a wall of the shuttle car for rotation about its longitudinal axis with its first end inside the shuttle car and its second end outside the shuttle car, a relatively flat plate member positioned on the first end of the support member in a plane generally parallel to the longitudinal axis on the support member so that the plate member is biased to extend vertically downwardly from the support member and a level indicator operatively connected to the second end of the support member so that when the plate member is rotatably urged toward a horizontal position by the increased height of particulate solids an indication of such increased height is provided to the shuttle car operator.

8 Claims, 3 Drawing Figures

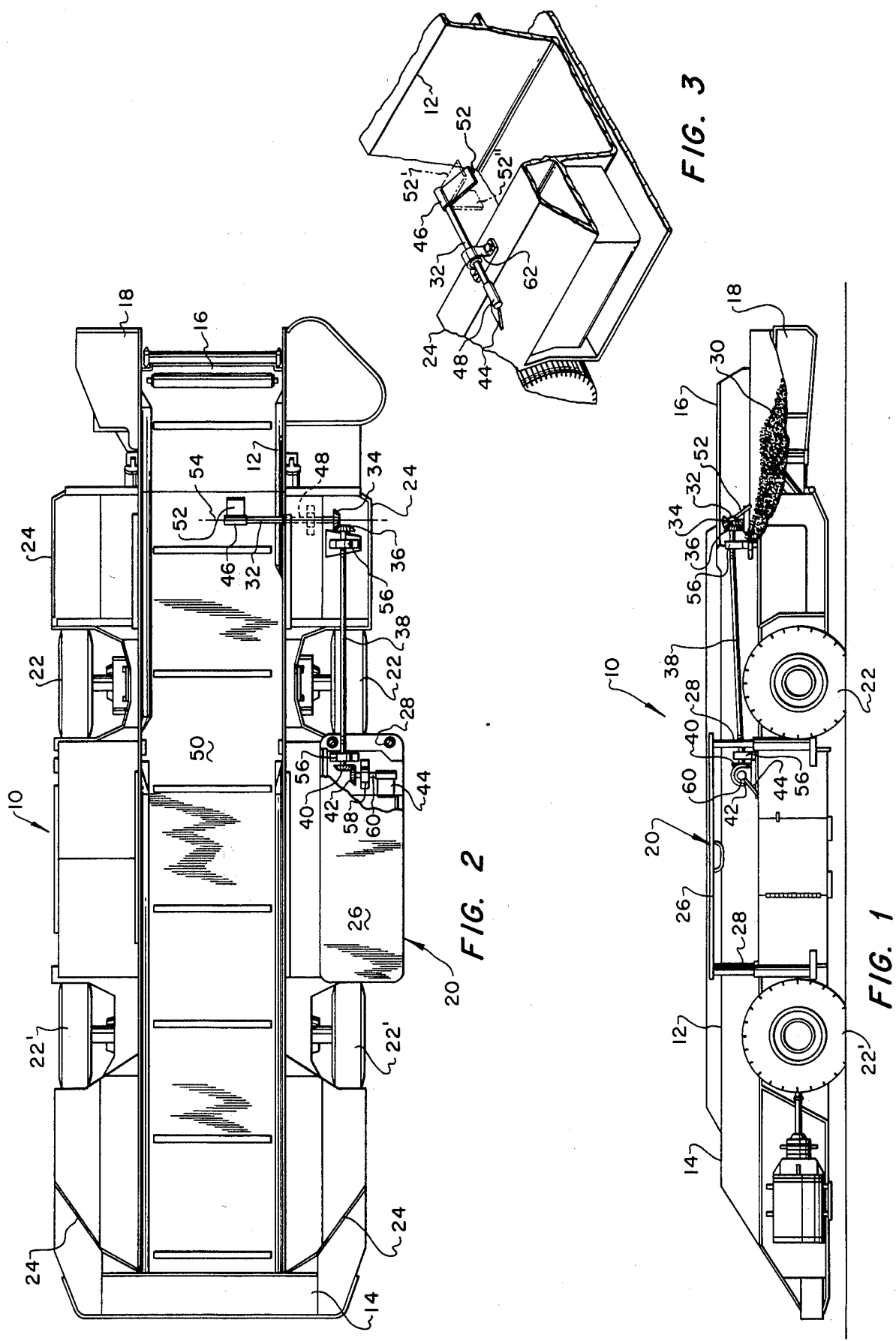

APPARATUS FOR DETECTING THE LEVEL OF PARTICULATE SOLIDS IN A SHUTTLE CAR

This invention relates to an apparatus for detecting an increase in the level of particulate solids in a shuttle car.

In various mining operations wherein particulate solids are removed from subterranean mines, shuttle cars are used for haulage. Typically particulate solids are loaded into a first end of the shuttle car by a conveyor connected to a mining machine or the like with the particulate solids than being moved along the length of the shuttle car toward a second end of the shuttle car by a conveyor positioned in the bottom of the shuttle car so that the entire shuttle car is substantially filled with particulate solids along its length. Such shuttle cars may also include an elevatable section at their front (second) end so that when the shttle car arrives at its destination the solids can be unloaded by starting the conveyor belt to move the solids along the length of the shuttle car, thereby conveying the particulate solids out of the shuttle car into a storage area or the like. Such shuttle cars are normally produced to have a very low headspace and typically include an operator's compartment which is mounted on one side of the car in a position between the car wheels or near the second end of the car. An operator drives and operates the shuttle car in the hauling operation.

In the use of such cars, it has been found that while the loading of solids into the first end of the shuttle car is readily controlled by observation by the operator of the loader, the operator of the shuttle car cannot visually detect when particulate solids have been conveyed to the second end of the shuttle car. This results in the unfortunate occurrence of solids dumping in front of the shuttle car in any instance where the operator fails to disengage the conveyor belt before the solids are discharged from the front end of the shuttle car. Alternatively, excessive caution on the part of the operator results in filling the shuttle car to less than capacity. When particulate solids are dumped in front of the shuttle car, it constitutes a major problem since such spills are directly in the path of the shuttle car and may prevent its passage. As a result, a continuing effort has been directed to the development of simple, reliable apparatus which will allow the operator to determine the level of the particulate solids in the shuttle car so that the car may be fully loaded but yet not overloaded to the point that particulate solids discharge from the front of the shuttle car.

According to the present invention, the level of particulate solids can be controlled and detected by the use of an apparatus for detecting an increase to a selected level of the height of a bed of particulate solids in a shuttle car for the transportation of particulate solids. The shuttle car includes a body means adapted to contain and transport particulate solids, means for receiving particulate solids in a first end of the shuttle car, conveyor means for moving particulate solids along the length of said shuttle car toward a second end of the shuttle car to substantially fill the shuttle car with particulatae solids and an operator compartment for a shuttle car operator. The apparatus comprises a support member adapted to be rotatably supported on or through a wall of the shuttle car for rotation about its longitudinal axis with its first end inside the shuttle car and its second end outside the shuttle car, a relatively flat plate member positioned on the first end of the suppoprt member in a plane generally parallel to the longitudinal axis of the support member so that the plate member is biased to extend vertically downwardly from the support member and a level indicator operatively connected to the second end of the support member so that when the plate member is rotatably urged toward a horizontal position by the increased height and movement of said particulate solids an indication of such increased height is provided to the operator.

FIG. 1 is a schematic side view of a shuttle car including an embodiment of the apparatus of the present invention;

FIG. 2 is a top view of the shuttle car shown in FIG. 1; and,

FIG. 3 is a sectional view of a shuttle car showing a preferred embodiment of the apparatus of the present invention.

In the description of the figures, the same numbers will be used to refer to the same or similar components throughout.

In FIG. 1 a shuttle car 10 is shown. Shuttle car 10 comprises a body 12 having a first end 14 and a second end 16. A hinged section 18 is positioned near second end 16. Hinged section 18 is rotatable to raise second end 16 to a predetermined level for discharging particulate solids from shuttle car 10. Shuttle car 10 also includes an operator's compartment 20 which includes a top 26 and sides 28. Operator's compartment 20 also normally contains a bench or other arrangement for the comfort of the operator (not shown) and normally a view space is available to the operator through one or both of walls 28. Operator's compartment 20 may be positioned between front wheels 22 and rear wheels 22' or near second end 16 of shuttle car 10. Shuttle car 10 is mounted on wheels 22 and 22' and adapted to transport particulate solids in a mine environment where low headspace is available. Accordingly, the height of shuttle car 10 is closely controlled so that it can operate in such environment.

In the operation of such shuttle cars, particulate solids are dumped into first end 14 and when first end 14 is filled to a desired level, a conveyor 50 (shown in FIG. 2) positioned in the lower portion of shuttle car 10 is started to move the particulate solids along the length of shuttle car 10 toward its second end 16 so that substantially the entire length of shuttle car 10 is filled with particulate solids to a level as shown by particulate solids 30 in the cut-away section of FIG. 1. Typically, shuttle car 10 will include a flange or rail member 24 about its upper edge to protect various hydraulic, electrical and other equipment which is required for the operation of shuttle car 10 and which is positioned beneath flange 24 around the outside of shuttle car 10. Such support equipment is normally positioned so that it is well protected during operations. Such shuttle cars are well known to the art and are supplied by a number of manufacturing companies for use in the movement of particulate solids in mines. Such shuttle cars are widely used in coal mining operations.

As discussed previously, the operator in many instances cannot visually detect the level of particulate solids near second end 16 of shuttle car 10. As a result, it is difficult to operate conveyor 50 for a sufficient time to fill substantially all of shuttle car 10 without discharging particulate solids from second end 16 onto the ground in front of shuttle car 10. Normally, second end 16 is open since in the operation of such shuttle cars the particulate solids are discharged by merely elevating hinged section 18 at a discharge area and re-engaging conveyor belt 50.

As shown in FIGS. 1 and 2, a support member 32 is positioned through a wall of body 12 and is rotatably mounted through the wall of body 12 for rotation about its longitudinal axix 54 (shown in FIG. 2). A plate member 52 is positioned on a first end 46 of support member 32 and is biased toward a vertically downward position. The biasing may be by the weight of plate member 52, by a spring or other suitable means (not shown). When particulate solids are moved along the length of shuttle car 10 and rise to a height such that particulate solids engage plate member 52, plate member 52 is raised to the position generally shown as 52' in FIG. 3. The vertically downward position for plate member 52 is shown in FIG. 3 as 52". As shown in FIG. 2, support member 32 includes on its second end 48 a gear 34 which engages a second gear 36 positioned on one end of a signal transmission member 38. Transmission member 38, which is rotatably supported by pillow blocks 56, extends into operator's compartment 20 and includes on its other end a gear 40 which engages a gear 42. Gear 42 activates an indicator member 44 (positioned on a shaft 60 which is rotatably supported by a pillow block 58) to indicate to the operator when the level of the particulate solids in shuttle car 10 has reached the level of plate member 52 so that the conveyor can be stopped.

In FIG. 3, a sectional view of shuttle car 10 is shown and includes a preferred embodiment of the apparatus of the present invention. Indicator member 44 is positioned on second end 48 of support member 22. Plate member 52 is in a vertically donward position and indicator member 44 is in its horizontal position in the absence of solids. When particulate solids reach a desired level, plate member 52 is moved by the solids to a position shown as 52' and indicator member 44 is moved to a vertical position where it is visible to the operator of the shuttle car and indicates that particulate solids have reached the desired level. In this embodiment, support member 32 is rotatably mounted on a wall of shuttle car 10 by means of a bracket 62.

By the use of either embodiment of the present invention, an increase in the height of particulate solids in a shuttle car can be detected at a selected point by the use of the apparatus of the present invention. The signal generated as a result of the increase in the height of the solids can be transmitted visually to the operator by the use of an indicator member on one end of support member 32 or by the use of an indicator member which is activated at a remote location by the movement of particulate solids in contact with plate member 52.

Having described the present invention by reference to its preferred embodiments, it is pointed out that the embodiments described above are illustrative rather than limiting in nature and that many variations and modifications are possible within the scope of the present invention. Many such variations and modifications may appear obvious and desirable to those skilled in the art based upon the foregoing description of preferred embodiments.

Having thus described the invention, I claim:

1. An apparatus for detecting an increase to a selected level of the height of a bed of particulate solids in a shuttle car for the transportation of said particulate solids, said shuttle car including a body means adapted to contain and transport said particulate solids, means for receiving said particulate solids in a first end of said shuttle car, conveyor means for moving said particulate solids along the length of said shuttle car toward a second end of said shuttle car to substantially fill said shuttle car with said particulate solids and an operator compartment for a shuttle car operator, said apparatus being positioned near said second end of said shuttle car and comprising a support member adapted to be rotatably supported on a wall of said body means for rotation about its longitudinal axis with its first end inside said body means and its second end outside said body means, a relatively flat plate member positioned on said first end of said support member in a plane generally parallel to said longitudinal axis of said support member so that said plate member is biased to extend vertically downwardly from said support member and a level indicator, said level indicator comprising an indicator member, positioned on said second end of said support member so that said indicator member is substantially horizontal when said plate member is in its vertical position and rotates generally about said longitudinal axis of said support member to a substantially vertical position when said plate member is rotatably urged toward a horizontal position by the increased height and movement of said particulate solids thereby providing an indication of such increased height to said operator.

2. An apparatus for detecting an increase to a selected level of the height of a bed of particulate solids in a shuttle car for the transportation of said particulate solids, said shuttle car including a body means adapted to contain and transport said particulate solids, means for receiving said particulate solids in a first end of said shuttle car, conveyor means for moving said particulate solids along the length of said shuttle car toward a second end of said shuttle car to substantially fill said shuttle car with said particulate solids and an operator compartment for a shuttle car operator, said apparatus being positioned near said second end of said shuttle car and comprising a support member adapted to be rotatably supported through a wall of said body means for rotation about its longitudinal axis with its first end inside said body means and its second end outside said body means, a relatively flat plate member positioned on said first end of said support member in a plane generally parallel to said longitudinal axis of said support member so that said plate member is biased to extend vertically downwardly from said support member and a level indicator said level indicator comprising an indicator member, positioned on said second end of said support member so that said indicator member is substantially horizontal when said plate member is in its vertical position and rotates generally about said longitudinal axis of said support member to a substantially vertical position when said plate member is rotatably urged toward a horizontal position by the increased height and movement of said particulate solids thereby providing an indication of such increased to said operator.

3. An apparatus for detecting an increase to a selected level of the height of a bed of particulate solids in a shuttle car for the transportation of said particulate solids, said shuttle car including a body means adapted to contain and transport said particulate solids, means for receiving said particulate solids in a first end of said shuttle car, conveyor means for moving said particuiate solids along the length of said shuttle car toward a second end of said shuttle car to substantially fill said shuttle car with said particulate solids and an operator compartment for a shuttle car operator, said apparatus being positioned near said second end of said shuttle car and comprising a support member adapted to be rotatably supported on a wall of said body means for rotation about its longitudinal axis with its first end inside said body means and its second end outside said body means, a relatively flat plate member positioned on said first end of said support member in a plane generally parallel to said longitudinal axis of said support member so that said plate member is biased to extend vertically downwardly from said support member and a level indicator operatively connected to said second end of said support member by an indicator signal transmission member having its first end in operative engagement with said second end of said support member and its second end in operative engagement with said level indicator so that when said plate member is rotatably urged toward a horizontal position by the increased height and movement of said particulate solids an indication of such increased height is provided to said operator.

4. The apparatus of claim 3 wherein said level indicator is in said operator compartment.

5. The apparatus of claim 3 wherein said first end of said transmission member includes a gear means in engagement with a gear means on said second end of said support member.

6. An apparatus for detecting an increase to a selected level of the height of a bed of particulate solids in a shuttle car for the transportation of said particulate solids, said shuttle car including a body means adapted to contain and transport said particulate solids, means for receiving said particulate solids in a first end of said shuttle car, conveyor means for moving said particulate solids along the length of said shuttle car toward a second end of said shuttle car to substantially fill said shuttle car with said particulate solids and an operator compartment for a shuttle car operator, said apparatus being positioned near said second end of said shuttle car and comprising a support member adapted to be rotatably supported through a wall of said body means for rotation about its longitudinal axis with its first end inside said body means and its second end outside said body means, a relatively flat plate member positioned on said first end of said support member in a plane generally parallel to said longitudinal axis of said support member so that said plate member is biased to extend vertically downwardly from support member and a level indicator operatively connected to said second end of said support member by an indicator signal transmission member having its first end in operative engagement with said second end of said support member and its second end in operative engagement with said level indicator so that when said plate member is rotatably urged toward a horizontal position by the increased height and movement of said particulate solids an indication of such increased height is provided to said operator.

7. The apparatus of claim 6 wherein said level indicator is in said operator compartment.

8. The apparatus of claim 6 wherein said first end of said transmission member includes a gear means in engagement with a gear means on said second and end of said support member.

* * * * *